United States Patent Office 3,243,343
Patented Mar. 29, 1966

3,243,343
IMINOALKYLBENZOTHIAZIDES
Jerry E. Robertson and John H. Biel, both of Milwaukee, Wis., assignors to Colgate-Palmolive Company, a corporation of Delaware
No Drawing. Filed July 17, 1961, Ser. No. 124,381
26 Claims. (Cl. 167—65)

This invention relates to novel compounds having therapeutic properties. More particularly, it relates to novel iminoalkylbenzothiazides having both diuretic and hypotensive effects.

The present invention provides novel compounds which have hypotensive activity, and in addition may be diuretically active on oral administration. These compounds comprise novel iminoalkylbenzothiazides which are the condensation reaction products of certain hydrazines with certain benzothiazide derivatives having a substituent containing a carbonyl group, and preferably a keto-alkyl group.

The compounds of the invention have the formulae

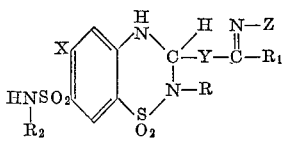

I and

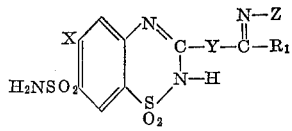

II wherein X is selected from the group consisting of bromo, chloro, trifluoromethyl and nitro; R is a member of the group consisting of hydrogen, a lower alkyl group such as methyl, ethyl, propyl, butyl, or the like, a monohalo- or polyhalo-lower alkyl group having at least two carbon atoms, such as chloroethyl, bromoethyl, and beta, beta, beta-trifluoroethyl, an alkenyl group such as a lower alkenyl group and particularly the allyl group and the 1-(2-butenyl) group, the propargyl group, an aralkyl group and particularly a phenyl-lower alkyl group such as the benzyl group; Y is selected from the group consisting of a chemical bond and a straight or branched chain alkylene group such as methylene, ethylene, propylene, methylethylene, and the like; $R_1$ represents hydrogen, an alkyl group and particularly a lower alkyl group such as methyl, ethyl, propyl, isopropyl, butyl, pentyl, hexyl and the like, an aryl group and particularly a monocyclic aryl group such as the phenyl group, and a nuclear substituted phenyl group such as the hydroxyphenyl, methoxyphenyl, chlorophenyl, and acetoxyphenyl groups, an aralkyl group and particularly one in which the aryl moiety is monocyclic and the alkyl moiety is a lower alkyl group such as benzyl, phenethyl, phenylpropyl, phenylisopropyl and p-chlorophenylpropyl groups; $R_2$ is hydrogen, a lower alkyl or phenyl-lower alkyl group such as methyl, ethyl, butyl, phenyl, phenethyl, phenylpropyl and the like; Z is a member of the group consisting of hydroxyl, a lower alkoxy group such as methoxy, ethoxy, propoxy and the like, an arylalkoxy group and particularly a phenyl-lower alkoxy group such as phenylmethoxy, phenylethoxy, phenylpropoxy and the like, the amino group, a substituted amino group including lower alkylamino groups such as methylamino, ethylamino, propylamino and the like, phenyl-lower alkylamino groups such as benzylamino and N-(3-phenyl-2-propyl)amino, phenyl-lower alkylamino-lower alkylamino groups such as N-benzyl-N-methylaminoethyl amino, and groups having the formulae

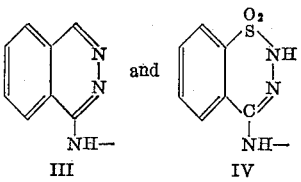

The novel compounds of the invention are conveniently produced by bringing a suitable hydrazine or hydroxylamine and a benzothiadiazine compound having a carbonyl-containing substituent such as a ketoalkyl group into intimate contact, advisably under liquid reaction conditions. This reaction can be represented for compounds of Formula I above as follows:

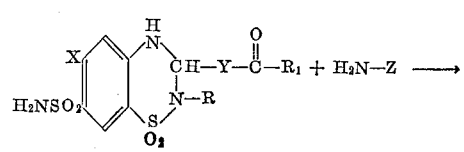

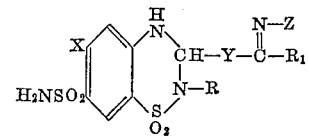

where X, Y, R, $R_1$, and Z have the significance previously assigned. Compounds of Formula II can be made in an analogous manner. In both cases, lower alcohols are suitable liquid reaction media.

In some cases the reaction proceeds at room temperature, although elevated temperatures up to the reflux temperature may be desirable to increase the rate of reaction. The reaction product can be recovered following conventional methods.

Some of the condensation products made in this way are:

(1) 6 - chloro-7-sulfamyl-3-(beta-oxopropyl)-1,2,4-benzothiadiazine-1,1-dioxide 1-phthalazinylhydrazone.
(2) 3,4 - dihydro-2-methyl-3-(beta-oxo-beta-phenylethyl)-7 - sulfamyl - 6-trifluoromethyl-1,2,4-benzothiadiazine-1,1-dioxide phenyl-isopropylhydrazone.
(3) 3,4 - dihydro-2-methyl-3-(beta-oxoethyl)-7-sulfamyl-6 - chloro-1,2,4-benzothiadiazine-1,1-dioxide 1-phthalazinylhydrazone.
(4) 3,4 - dihydro-6-chloro-7-sulfamyl-3-(beta-oxopropyl)-1,2,4-benzothiadiazine-1,1-dioxide 1-phthalazinylhydrazone.
(5) 3,4 - dihydro - 2 - (beta, beta, beta-trifluoroethyl)-6-nitro - 7-sulfamyl-3-(beta-oxopropyl)-1,2,4-benzothiadiazine - 1,1 - dioxide 4 - (1,1-dioxo-1,2,3-benzothiadiazinyl)-hydrazone.
(6) 3,4 - dihydro - 2 - allyl-6-chloro-7-sulfamyl-3-(beta-oxopropyl)-1,2,4-benzothiadiazine1,1-dioxide 1-phthalazinylhydrazone.
(7) 3,4 - dihydro - 2 - benzyl-6-nitro-7-benzylsulfamyl-3-(beta - oxobeta - phenylethyl)-1,2,4-benzothiadiazine-1,1-dioxide 1-phthalazinylhydrazone.
(8) 3,4 - dihydro-2-methyl-6-trifluoromethyl-7-sulfamyl-3 - (gamma-oxobutyl)-1,2,4-benzothiadiazine-1,1-dioxide O-benzyloxime.
(9) 3,4 - dihydro-2-methyl-6-trifluoromethyl-7-sulfamyl-3 - (gamma-oxobutyl)-1,2,4-benzothiadiazine-1,1-dioxide oxime.

(10) 3,4 - dihydro-2-methyl-6-trifluoromethyl-7-sulfamyl-3 - (gamma-oxobutyl)-1,2,4-benzothiadiazine-1,1-dioxide O-(p-methoxy)-benzyloxime.
(11) 3,4 - dihydro - 2 - ethyl-6-nitro-7-sulfamyl-3-(beta-oxopropyl) - 1,2,4 - benzothiadiazine - 1,1 - dioxide 1-phthalazinylhydrazone.
(12) 3,4 - dihydro - 2-methyl-3-(beta-oxopropyl)-7-sulfamyl - 6-trifluoromethyl - 1,2,4-benzothiadiazine-1,1-dioxide phenylisopropylhydrazone, and the products of the examples given below.

In general, the reactants used in producing the compounds of the invention are described in the literature or otherwise known to those skilled in the art, with some exceptions. The 3,4 - dihydro - 3-oxoalkyl benzothiadiazines used in forming the compounds of Formula I above can be prepared, as described in the copending application of Jerry E. Robertson, Ser. No. 105,908, filed April 27, 1961, by reacting the appropriate 2,4-disulfamylaniline with a ketoaldehyde or ketoacetal as shown by:

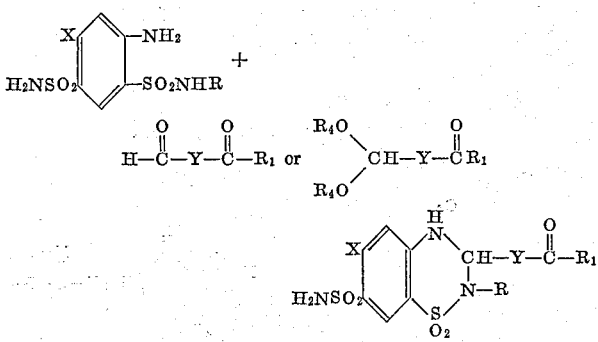

wherein X, R, $R_1$, and Y have the significance previously assigned and $R_4$ is a lower alkyl such as methyl or ethyl.

The 3-oxoalkyl benzothiadiazines used in preparing the compounds of Formula II above can be made by means of the following reaction:

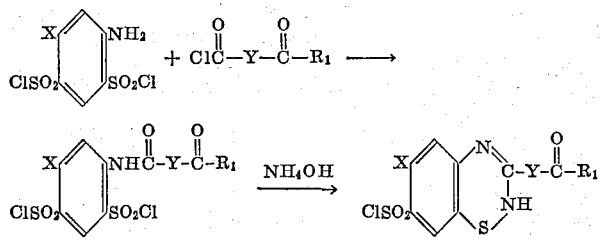

where X, $R_1$, and Y have the previously assigned significance.

Some of the 3-ketoalkyl-substituted benzothiadiazines which can be made as described are:

2 - benzyl - 3,4 - dihydro-3-acetyl-7-sulfamyl-6-trifluoromethyl-1,2,4-benzothiadiazine-1,1-dioxide
2 - allyl - 6-chloro-3,4-dihydro-3-(beta-oxopropyl)-7-sulfamyl-1,2,4-benzothiadiazine-1,1-dioxide
2 - phenethyl - 3,4 - dihydro-3-acetyl-7-sulfamyl-6-nitro-1,2,4-benzothiadiazine-1,1-dioxide
3 - (beta - oxobutyl)-6-chloro-7-sulfamyl-1,2,4-benzothiadiazine-1,1-dioxide The 3-ketoalkyl substituted benzothiadiazine made as indicated above is reacted with a suitable amino compound. Thus, in Formulas I and II, when Z is —OH, the required amino reactant is hydroxylamine; when Z is —NH₂ or a lower alkoxy group the reactant is hydrazine or a O-(lower alkyl)-hydroxylamine, respectively.

Compounds of the invention in which Z is a phenyl-lower alkoxy group are prepared by reacting the substituted benzothiadiazine with an O-phenyl-lower alkyl hydroxylamine, such as O-benzylhydroxylamine, or O-phenylisopropylhydroxylamine, O - [2-(1-phenylpropyl)]hydroxylamine. Substituted hydroxylamines of this type are prepared by reacting a phenyl alkyl alcohol with chloramine as described by Theilacker et al. for the production of O-benzylhydroxylamine in Angewandte Chemie 68, 303 (1956), and as set forth in the copending application of John H. Biel, Ser. No. 85,979, filed January 31, 1961, now abandoned, or process variations thereof within the skill of the art.

The reactants used to produce the substituent (Z) groups set forth in Formulas II and IV are both known compounds, respectively, 1 - hydrazinonaphthalazine, a commercially available material, and 4-hydrazino-1,2,3-benzothiadiazine - 1,1 - dioxide (E. Schrader, J. Prakt. Chemie 96, 180 (1917)).

Compounds of the invention containing Z-substituents which are substituted amino groups such as lower alkylamino and phenyl-lower alkylamino are prepared from the corresponding hydrazine compounds, i.e., the lower alkyl hydrazines and the phenyl-lower alkyl hydrazines. The latter group of compounds can be prepared by reacting the corresponding phenyl-lower alkyl halide with hydrazine, as described in the copending John H. Biel patent application Ser. No. 840, 016, filed September 15, 1959. Similarly, Z-substituent phenyl-lower alkylamino-lower alkylamino groups in the compounds of the invention are obtained by reaction involving the corresponding hydrazines. The preparation of this latter group of compounds is described in the copending John H. Biel patent application Ser. No. 6,380, filed February 3, 1960, now Patent No. 3,197,474. Typical examples of such reactants are N-phenylaminoethyl hydrazine, N-benzyl-N-methylaminoethyl hydrazine and N-phenyl-N-allylaminoisopropyl hydrazine.

In addition to their hypotensive activity, the compounds may also have diuretic properties which surprisingly may be dependent on the mode of administration. Thus, for example, the compound of Example 2 below on oral administration has both hypotensive and diuretic properties. On the other hand, on intravenous injection of the compound of Example 1, it has been found that not only is no diuretic activity produced by the compound itself, but there also results a blocking effect which inhibits the diuretic action of the known diuretic compound Dihydrodiuril (3,4 - dihydro-7-sulfamyl-6-chloro-1,2,4-benzothiadiazine-1,1-dioxide). This result may be extremely significant in elucidating the mechanism of the hypotensive action possessed by the "thiazide" drugs.

The compounds of the invention are preferably administered orally to animals including man in suitable pharmaceutical unit dosage forms such as tablets, capsules and powders. The quantity of active compounds included in such unit dosage forms may vary since all of the compounds of the invention are not of equal effectiveness. Such unit dosage forms, however, can typically contain about 2 to 500 mg. of one or a mixture of two or more of the active compounds for administration on a daily basis.

The following examples are presented to illustrate the preparation of representative compounds within the scope of the invention.

EXAMPLE 1

*3,4 - dihydro - 2 - methyl - 3 - (beta - oxopropyl) - 7 - sulfamyl - 6 - trifluoromethyl-1,2,4-benzothiadiazine - 1,1-dioxide 1-phthalazinylhydrazone*

3,4-dihydro - 2 - methyl-3-(beta-oxopropyl)-7-sulfamyl-6 - trifluoromethyl-1,2,4-benzothiadiazine-1,1-dioxide (8.0 g., 0.020 mole) and 2.9 g. (0.018 mole 1-hydrazinophthalazine were refluxed together in 150 ml. ethanol with 2 drops of acetic acid for 18 hours. The mixture was cooled and the solid which separated was collected and dried to afford 3.5 g. (36%) of product, M.P. 180–182° C.

*Analysis.*—Calcd. for $C_{20}H_{20}F_3N_7O_4S_2$: N, 18.04; S, 11.79. Found: N, 18.14; S, 11.89.

EXAMPLE 2

*3,4-dihydro - 2 - methyl-3-(beta-oxopropyl)-7-sulfamyl-6-trifluoromethyl-1,2,4-benzothiadiazine - 1,1 - dioxide 4-(1,1-dioxo-1,2,3-benzothiadiazinyl)-hydrazone*

3,4 - dihydro-2-methyl-3-(beta-oxopropyl)-7-sulfamyl-6 - trifluoromethyl-1,2,4-benzothiadiazine-1,1-dioxide (2.0 g., 0.0050 mole) and 1.25 g. (0.0050 mole) 4-hydrazino-1,2,3-benzothiadiazine-1,1-dioxide hydrochloride were dissolved in 50 ml. ethanol and the solution refluxed for 5 minutes. Dilution to 200 ml. with water and cooling gave a solid which was collected, washed with water and dried to afford 2.2 g. (74%) of product, M.P. 148–151° C.

*Analysis.*—Calcd. for $C_{19}H_{19}F_3N_7O_6S_3$: C, 38.33; H, 3.38; S, 16.15. Found: C, 38.44; H, 3.33; S, 16.06.

EXAMPLE 3

*3,4-dihydro - 2 - methyl-3-(beta-oxopropyl)-7-sulfamyl-6-trifluoromethyl - 1,2,4 - benzothiadiazine - 1,1 - dioxide oxime*

A solution of 2.5 g. (0.00625 mole) of 3,4-dihydro-2-methyl - 3-(beta-oxopropyl)-7-sulfamyl-6-trifluoromethyl-1,2,4-benzothiadiazine-1,1-dioxide, 10 ml. pyridine, and 1.7 g. (0.0125 mole) hydroxylamine hydrochloride in 25 ml. ethanol was stirred at room temperature for 1 hour. Dilution to 200 ml. with water and cooling gave a solid which was collected, washed with water and dried to afford 2.3 g. (89%) of product, M.P. 213–215° C. (dec.).

*Analysis.*—Calcd. for $C_{12}H_{15}F_3N_4O_5S_2$: N, 13.46; S, 15.39. Found: N, 13.25; S, 15.00.

EXAMPLE 4

*6-chloro-3,4-dihydro-2-methyl-7 - methylsulfamyl-3-(beta-oxopropyl)-1,2,4-benzothiadiazine-1,1-dioxide 1-phthalazinylhydrazone*

6-chloro - 3,4-dihydro - 2-methyl - 7-methylsulfamyl-3-(beta-oxopropyl)-1,2,4 - benzothiadiazine - 1,1-dioxide (3.7 g., 0.0097 mole), 1.60 g. (0.010 mole) 1-hydrazinophthalazine, and 0.5 ml. glac. acetic acid were dissolved in 80 ml. ethanol and the solution was refluxed for 15 minutes. A solid separated during the heating period. After dilution with 50 ml. water and cooling, the precipitate was collected, washed with dilute ethanol and dried. This crude product was triturated under 100 ml. boiling ethanol, collected and dried to afford 2.1 g. (40%) of product, M.P. 159–161° C.

*Analysis.*—Calcd. for $C_{20}H_{22}ClN_7O_4S_2$: Cl, 6.75; S, 12.21. Found: Cl, 6.66; S, 12.00.

The 6-chloro-2 - methyl - 7-methylsulfamyl-3-(beta-oxopropyl) - 1,2,4 - benzothiadiazine 1,1-dioxide used in the above example was prepared as follows.

5-chloro - 2,4 - di(methylsulfamyl)aniline (10.0 g., 0.033 mole), 5.3 g. (0.040 mole) 3-oxobutyraldehyde dimethyl-acetal, and 1.0 ml. conc. HCl were dissolved in 50 ml. DMF and the solution was held at 90–100° C. for 0.5 hour. The solvent was removed in vacuo and the residue dissolved in 60 ml. ethanol. After a Darco treatment, this solution was diluted with 500 ml. of hot water and cooled. A gum separated from which was decanted the mother liquor. Extended drying of the gum afforded 7.4 g. (67%) of the product as an amorphous solid.

*Analysis.*—Calcd. for $C_{12}H_{16}ClN_3O_5S_2$: Cl, 9.29; S, 16.81. Found: Cl, 9.05; S, 16.59.

EXAMPLE 5

*3,4 - dihydro-6 - nitro- 3- (beta-oxopropyl) - 7-sulfamly-2H-1,2,4-benzothiadiazine - 1,1 - dioxide 4-(1,1-dioxo-1,2,3-benzothiadiazinyl)-hydrazone*

3,4-dihydro-6 - nitro-3 - (beta-oxopropyl) - 7-sulfamyl-2H-1,2,4-benzothiadiazine - 1,1-dioxide (3.65 g., 0.010 mole), 2.1 g. (0.010 mole) 4-hydrozino - 1,2,3 - benzo- thiadiazine-1,1-dioxide, and 5 drops of glac. acetic acid were dissolved in a mixture of 60 ml. methanol with 15 ml. DMF. After 0.5 hours at reflux the solution was diluted to the cloud point with hot water (ca. 20 ml.) then cooled. A solid separated which was collected, washed with dilute ethanol and dried to afford 4.2 g. (80%) of the product as an amorphous solid.

*Analysis.*—Calcd. for $C_{17}H_{18}N_{18}N_8O_8S_3$: S, 17.22. Found: S, 17.08.

EXAMPLE 6

*6-chloro - 3,4 - dihydro-3-(beta-oxopropyl)-7-sulfamyl-2H-1,2,4-benzothiadiazine - 1,1-dioxide 1-phthalazinylhydrazone*

1-hydrazinophthalazine (1.60 g., 0.010 mole), 3.54 g. (0.010 mole) of 6-chloro-3,4-dihydro-3-beta-oxopropyl)-7-sulfamyl-2H-1,2,4-benzothiadiazine - 1,1-dioxide and 5 drops of glacial acetic acid were refluxed together in 90 ml. of ethanol for 10 minutes. The solution which formed was filtered, cooled, and diluted with 220 ml. of water. A solid separated on standing which was collected, washed with water, dried, triturated with 25 ml. of boiling ethanol, collected, and redried to afford 2.0 g. (40%) of product M.P. 172–174° C.

*Analysis.*—Calcd. for $C_{18}H_{18}ClN_7O_4S_2$: Cl, 7.15; S, 12.92. Found: Cl, 7.31; S, 13.02.

Various changes and modifications of the invention can be made and, to the extent that such variations incorporate the spirit of this invention, they are intended to be included within the scope of the appended claims.

What is claimed is:

1. A compound selected from the group consisting of compounds having the formulae

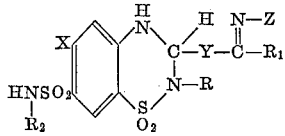

and

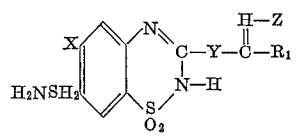

wherein X is a member of the group consisting of bromo, chloro, trifluoromethyl, and nitro; R is selected from the group consisting of hydrogen, lower alkyl, halo-lower alkyl having at least two carbon atoms, lower alkenyl, and phenyl-lower alkyl; Y is selected from the group consisting of a chemical bond and lower alkylene; $R_1$ is selected from the group consisting of hydrogen, lower alkyl, phenyl, and phenyl-lower alkyl; $R_2$ is selected from the group consisting of hydrogen, lower alkyl and phenyl-lower alkyl; and Z is selected from the group consisting of hydroxyl, lower alkoxy, phenyl-lower alkoxy, amino, lower alkylamino, phenyl-lower alkylamino, phenyl-lower alkyl-amino-lower-alkylamino, and N-lower alkyl-N-(phenyl-lower alkyl)-amino-lower alkylamino.

2. A compound having the formula

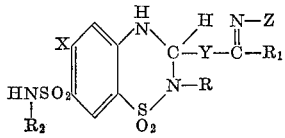

wherein X is a member of the group consisting of bromo, chloro, trifluoromethyl, and nitro; R is selected from the group consisting of hydrogen, lower alkyl, lower alkenyl, and phenyl-lower alkyl; Y is selected from the group consisting of a chemical bond and lower alkylene; $R_1$ is selected from the group consisting of hydrogen, lower alkyl, phenyl, and phenyl-lower alkyl; $R_2$ is selected from the group consisting of hydrogen, lower alkyl and phenyl-lower alkyl; and Z is selected from the group consisting of hydroxyl, lower alkoxy, phenyl-lower alkoxy, amino, lower alkylamino, phenyl-lower alkylamino, phenyl-lower alkyl-amino-lower alkylamino, and N-lower alkyl-N-(phenyl-lower alkyl)-amino-lower alkylamino.

3. 3,4-dihydro - 2 - lower alkyl-3-(keto-lower alkyl)-7-sulfamyl - 6 - trifluoromethyl-1,2,4-benzothiadiazine-1,1-dioxide 1-phthalazinylhydrazone.

4. 3,4-dihydro-2-allyl-3-(keto-lower alkyl)-7-sulfamyl-6-trifluoromethyl - 1,2,4 - benzothiadiazine - 1,1 - dioxide 1-phthalazinylhydrazone.

5. 3,4-dihydro-2-lower alkyl - 3 - (keto-lower alkyl)-7-sulfamyl - 6 - chloro-1,2,4-benzothiadiazine-1,1-dioxide-1-phthalazinylhydrazone.

6. 3-(keto-lower alkyl) - 7-sulfamyl-6-trifluoromethyl-1,2,4-benzothiadiazine - 1,1 - dioxide 1-phthalazinylhydrazone.

7. 3-(keto-lower alkyl)-7-sulfamyl-6-chloro-1,2,4-benzothiadiazine-1,1-dioxide 1-phthalazinylhydrazone.

8. 3,4-dihydro-2-lower alkyl - 3 - (keto-lower alkyl)-7-sulfamyl-6-trifluoromethyl - 1,2,4 - benzothiadiazine-1,1-dioxide 4-(1,1-dioxo-1,2,3-benzothiadiazinyl)-hydrazone.

9. 3,4-dihydro-2-allyl-3-(keto-lower alkyl)-7-sulfamyl-6-trifluoromethyl - 1,2,4 - benzothiadiazine - 1,1 - dioxide 4-(1,1-dioxo-1,2,3-benzothiadiazinyl)-hydrazone.

10. 3,4-dihydro-2-lower alkyl-3-(keto-lower alkyl)-7-sulfamyl - 6 - chloro - 1,2,4 - benzothiadiazine - 1,1 - dioxide 4-(1,1-dioxo-1,2,3-benzothiadiazinyl)-hydrazone.

11. 3-(keto-lower alkyl)-7-sulfamyl-6-trifluoromethyl-1,2,4 - benzothiadiazine - 1,1-dioxide 4-(1,1-dioxo-1,2,3-benzothiadiazinyl)-hydrazone.

12. 3-(keto-lower alkyl)-7-sulfamyl-6-chloro-1,2,4-benzothiadiazine-1,1-dioxide 4-(1,1-dioxo - 1,2,3 - benzothiadiazinyl)-hydrazone.

13. 3,4-dihydro-2-lower alkyl-3-(keto-lower alkyl)-7-sulfamyl - 6 - trifluoromethyl - 1,2,4 - benzothiadiazine-1,1-dioxide phenylisopropylhydrazone.

14. 3,4 - dihydro - 2 - allyl-3-(keto-lower alkyl)-7-sulfamyl - 6 - trifluoromethyl - 1,2,4 - benzothiadiazine-1,1-dioxide phenylisopropylhydrazone.

15. 3,4-dihydro - 2-lower alkyl-3-(keto-lower alkyl)-7-sulfamyl-6-chloro - 1,2,4 - benzothiadiazine - 1,1 - dioxide phenylisopropylhydrazone.

16. 3-(keto-lower alkyl)-7-sulfamyl-6-trifluoromethyl-1,2,4 - benzothiadiazine - 1,1 - dioxide phenylisopropylhydrazone.

17. 3-(keto - lower alkyl) - 7 - sulfamyl-6-chloro-1,2,4-benzothiadiazine-1,1-dioxide phenylisopropylhydrazone.

18. 3,4-dihydro - 2 - methyl-3-(beta-oxopropyl)-7-sulfamyl-6-trifluoromethyl - 1,2,4 - benzothiadiazine-1,1-dioxide 1-phthalazinylhydrazone.

19. 3,4-dihydro-2-lower alkyl - 3 - (beta-oxopropyl)-7-sulfamyl - 6 - trifluoromethyl - 1,2,4 - benzothiadiazine-1,1-dioxide 4-(1,1-dioxo-1,2,3-benzothiadiazinyl)-hydrazone.

20. 3,4-dihydro - 2 - methyl - 3 - (beta-oxopropyl)-7-sulfamyl - 6 - trifluoromethyl-1,2,4-benzothiadiazine-1,1-dioxide 4-(1,1-dioxo-1,2,3-benzothiadiazinyl)-hydrazone.

21. 3,4 - dihydro - 2 - lower alkyl-3-(beta-oxopropyl)-7-sulfamyl-6-nitro - 1,2,4-benzothiadiazine - 1,1 - dioxide 4-(1,1-dioxo-1,2,3-benzothiadiazinyl)-hydrazone.

22. 3,4-dihydro - 2 - methyl-3-(beta-oxopropyl)-7-sulfamyl-6-trifluoromethyl - 1,2,4 - benzothiadiazine-1,1-dioxide oxime.

23. 3,4 - dihydro - 2 - lower alkyl-3-(beta-oxopropyl)-7-sulfamyl - 6 - trifluoromethyl - 1,2,4 - benzothiadiazine-1,1-dioxide-O-benzyloxime.

24. 6-chloro - 3,4 - dihydro-2-methyl-7-methylsulfamyl-3-(beta-oxopropyl) - 1,2,4 - benzothiadiazine-1,1-dioxide 1-phthalazinylhydrazone.

25. 3,4-dihydro - 6 - nitro - 3 - (beta-oxopropyl)-7-sulfamyl - 2H - 1,2,4-benzothiadiazine - 1,1 - dioxide 4-(1,1-dioxo-1,2,3-benzothiadiazinyl)-hydrazone.

26. The method of inducing a hypotensive effect in an animal which comprises administering a compound of claim 1.

References Cited by the Examiner

Novello et al.: J. Org. Chem. volume 25, pages 970–980 (1960).

NICHOLAS S. RIZZO, *Primary Examiner.*